United States Patent
Slack et al.

(10) Patent No.: US 9,753,723 B2
(45) Date of Patent: Sep. 5, 2017

(54) SYSTEMS AND METHODS FOR GENERATING, LINKING, AND PRESENTING COMPUTER CODE REPRESENTATIONS FROM DIVERSE SOURCES

(71) Applicant: SourceGraph, Inc., San Francisco, CA (US)

(72) Inventors: Samuel Quinn Slack, San Francisco, CA (US); Beyang Liu, San Francisco, CA (US)

(73) Assignee: SOURCEGRAPH, INC., San Francisco, CA (US)

(*) Notice: Subject to any disclaimer, the term of this patent is extended or adjusted under 35 U.S.C. 154(b) by 11 days.

(21) Appl. No.: 14/479,019

(22) Filed: Sep. 5, 2014

(65) Prior Publication Data
US 2015/0074633 A1 Mar. 12, 2015

Related U.S. Application Data

(60) Provisional application No. 61/874,937, filed on Sep. 6, 2013.

(51) Int. Cl.
*G06F 9/44* (2006.01)
(52) U.S. Cl.
CPC .................... *G06F 8/75* (2013.01)
(58) Field of Classification Search
CPC ....................... G06F 8/30; G06F 8/75
USPC .................................. 717/101, 137
See application file for complete search history.

(56) References Cited

U.S. PATENT DOCUMENTS

| | | | | |
|---|---|---|---|---|
| 6,311,327 | B1* | 10/2001 | O'Brien | G06F 11/3466 714/35 |
| 7,441,238 | B2* | 10/2008 | Zatloukal | G06F 8/41 717/140 |
| 8,316,359 | B2* | 11/2012 | Lin | G06F 8/34 717/137 |
| 2004/0255277 | A1* | 12/2004 | Berg | G06F 11/3604 717/124 |
| 2005/0044537 | A1* | 2/2005 | Zatloukal | G06F 8/41 717/140 |
| 2009/0037830 | A1* | 2/2009 | Kulkarni | G06F 9/4448 715/764 |
| 2010/0146492 | A1* | 6/2010 | Shacham | G06F 8/76 717/137 |
| 2013/0007701 | A1* | 1/2013 | Sundararam | G06F 8/30 717/109 |
| 2015/0013011 | A1* | 1/2015 | Brucker | G06F 21/577 726/25 |

* cited by examiner

*Primary Examiner* — Ryan Coyer
(74) *Attorney, Agent, or Firm* — Orrick, Herrington & Sutcliffe, LLP

(57) ABSTRACT

Systems and methods for generating a language-independent representation of a software project's structure from its code comprises: generating a language-specific representation of code structure from a software project; augmenting the language-specific representation with additional, inferred information about its components; and mapping from language-specific components to language-independent components.

20 Claims, 9 Drawing Sheets

SYSTEMS AND METHODS FOR GENERATING, LINKING, AND PRESENTING COMPUTER CODE REPRESENTATIONS FROM DIVERSE SOURCES

CROSS-REFERENCE TO RELATED APPLICATIONS

The present application claims priority to U.S. Provisional Patent Application Ser. No. 61/874,937, filed on Sep. 6, 2013, entitled "Systems and Methods for Generating, Linking, and Presenting Computer Code Representations from Diverse Sources." U.S. Provisional Patent Application Ser. No. 61/874,937 is herein incorporated by reference in its entirety and for all purposes.

FIELD OF THE INVENTION

Embodiments are directed to systems and methods for representations and models of computer programming, and more specifically, to systems and methods that generate language-independent computer code inferences and representations of a computer programming project structure.

BACKGROUND

Software projects contain a number of components including, for example, modules and packages, functions, types, variables, dependencies—relationships specifying conditions (frequently the installed presence of other software projects) required to install and/or run code components, comments—annotations of human-readable and/or machine-readable information about the components, and exports/public application programming interface (API) definitions—specifications describing how code components may be used from/with external components.

The structure of the software project is defined by the way that its components are configured. By way of example, a simple software project using modular programming for generating random numbers may include a nested structure for a module named "random." The module "random" depends on an external software project called "rand" and a function named "getRandomNumber." The function "getRandomNumber" returns a numeric value of type "integer," contains a local variable named "n" of the type "integer," and includes one or more comments (i.e., human-readable documentation) for using the function. A software project defined by the same structural representation of components could be written in almost any computer language in use today.

However, the specific code required (e.g., the level of express/explicit code) would vary greatly depending on the language. Some languages require full specification of all components (e.g., every function must specify the types of its parameters and return values); some languages can automatically infer specifications for some components (e.g., type inference); and some languages don't require any specification of types or other attributes of components. In the example discussed above, some languages require express specification that "getRandomNumber" returns a numeric value of type "integer," whereas other languages allow the return value type to be inferred.

To recognize components in programming code, a system contains a set of rules and patterns (e.g., syntactic and semantic rules) that describe each component and how to recognize it. As an example, a programming language may specify that a function component is defined whenever it encounters the string "function NAME( ) { }," where NAME becomes the name of the function.

Using the rules and patterns for a specific language, "compilers" or "interpreters" are programs (or set of programs) that convert the programming language (source code) into machine-readable code files (target language, often having a binary form known as object code), which can be executed later by a computer. Typically, interpreters immediately execute the source code, often using an ephemeral, intermediate machine code (non-human-readable) representation.

However, because specific information may not be required to execute the source code, conventional compilers and interpreters may omit and alter information in the source code (e.g., the names of components, the types of components, comments/annotations, the original locations where components were defined, the dependencies, etc.).

Furthermore, at a macro level, software components are organized into distinct units known as "packages" and "modules," as briefly discussed above. A package contains a collection of related, individual components (e.g., types, functions, constants) that, together, implement a higher level capability or behavior. For instance, a function that can respond to Hyptertext Transfer Protocol (HTTP) requests, a type that represents an HTTP request, and a type that represents an HTTP response can be grouped into a single HTTP package.

In addition to serving as a unit of organization, a package also provides an API. Every package has a name that can be referenced and used by other packages. For example, a package to handle HTTP requests might reference a string parsing package that is able to parse Uniform Resource Locators (URLs). The API is the set of components that a package makes accessible to code from other packages. A reference is any instance of the name of a component (e.g., package, function, type, etc.) other than the component definition. A cross-reference occurs when a package refers to another package, either directly via its name or via a reference to one of its sub-components. Stated in another way, a cross-reference is any reference that refers to an entity outside the current code's package (i.e., any instance where one package makes use of the logic and behavior of another package).

To cross-reference and make use of another package, the referenced package first must be imported into the code currently being written. The import process includes resolving the package name into a location and fetching the package from that location. Most computer languages have at least one package manager (also known as a dependency management system) that is responsible for the import process. Depending on the language, a package's name can be universally unique (e.g., "github.com/gorilla/mux"). However, if the language does not guarantee unique naming conventions (e.g., "django"), the package manager must be manually configured, or enhanced, to ensure the proper resolution of package names to unique locations.

Nevertheless, despite the variances introduced across multiple programming languages, the software project's structure maintains a level of consistency that can be beneficial across various platforms. Unfortunately, conventional methods for understanding software projects (e.g., compilers discussed above) are rarely language-independent and may omit/alter useful information. Accordingly, a need exists for an improved system and method for developing a representation of software project structure in an effort to overcome the aforementioned obstacles and deficiencies of prior art systems.

SUMMARY

In one embodiment, a method for generating a language-independent representation of a software project's structure from its code comprises: generating a language-specific representation of code structure from a software project; augmenting the language-specific representation with additional, inferred information about its components; and mapping from language-specific components to language-independent components.

In an alternative embodiment, the method may further include: globally resolving packages for multiple languages; identifying and locating cross-references; and linking the located cross-references to cross-referenced entities.

In yet another embodiment, the augmenting of the language-specific representation with additional, inferred information comprises analyzing global information regarding the use of the software project over a data network.

In another alternative embodiment, a computer program product for generating a language-independent representation of a software project's structure from its code comprises: instructions for generating a language-specific representation of code structure from a software project; instructions for augmenting the language-specific representation with additional, inferred information about its components; and instructions for mapping from language-specific components to language-independent components.

In another alternative embodiment, the computer program product may further include: instructions for globally resolving packages for multiple languages; instructions for identifying and locating cross-references; and instructions for linking the located cross-references to cross-referenced entities.

In yet another alternative embodiment, a system for generating a language-independent representation of a software project's structure from its code comprises: one or more language analyzers, wherein the one or more language analyzers each comprise a language structurer system and a language inferencer system for a selected language, said language structure configured to generate a language-specific representation of code structure from the software project, said language inference configured for augmenting the language-specific representation with additional, inferred information about its components; one or more language translators in communication with said one or more language analyzers for mapping from language-specific components to language-independent components; and a database for storage of the language-independent components.

In an alternative embodiment, said language analyzers are further configured to globally resolve packages for multiple languages, identify and locate cross-references, and link the located cross-references to cross-referenced entities.

Other systems, methods, features, and advantages of the invention will be or will become apparent to one with ordinary skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF PREFERRED EMBODIMENTS

Figure 1:
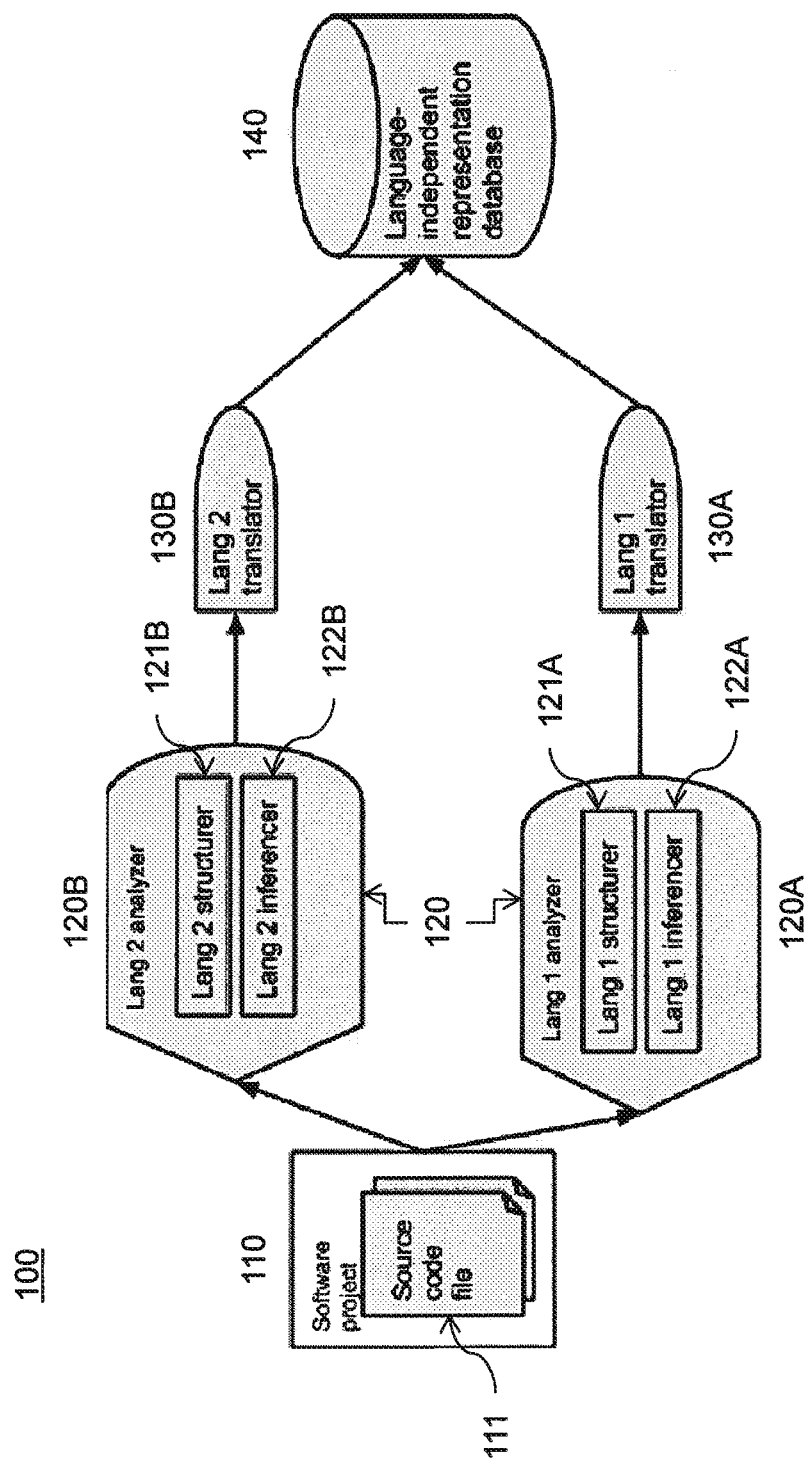
FIG. 1 illustrates a functional diagram of a system for generating language-independent representations of software in accordance with one embodiment of the present invention.

As discussed above, despite the variances introduced across multiple programming languages, the software project's structure maintains a level of consistency that can be beneficial across various platforms. Accordingly, FIG. 1 illustrates a system 100 that generates a language-independent representation of a software project's structure from its code. As illustrated, a software project 110 includes one or more source code files 111. Each of these source code files 111 is written using one or more programming languages. Any suitable programming language may be used to create source code files 111. For illustrative purposes only, suitable programming languages include, but are not limited to, assembly language, Ada, APL, Basic, C, C++, C#, Clojure, COBOL, dBase, Forth, FORTRAN, Go, Java, JavaScript, Lisp, Modula-2, Objective C, Pascal, PHP, Prolog, Python, Ruby, and REXX.

For each language used in software project 110, system 100 includes language analyzers 120 to generate a language-specific representation of its respective code structure. In this example, system 100 includes language analyzers 120A and 120B. However, one of ordinary skill in the art would appreciate that any number of language analyzers can be used, such as, the number of languages used in software project 110.

Figure 2:
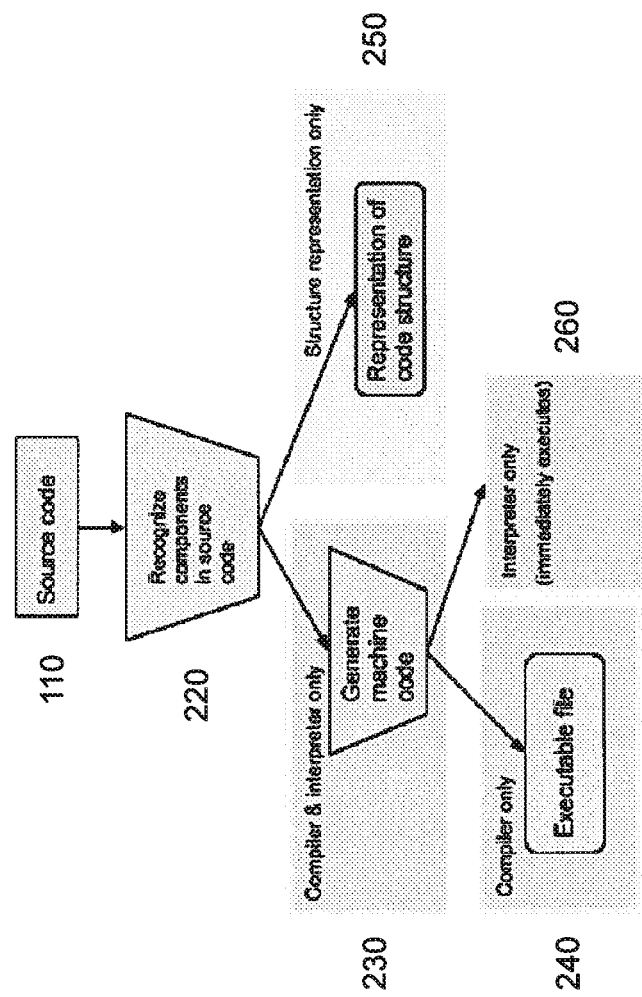
FIG. 2 illustrates a functional diagram to produce a representation of code structure and machine-code from a common source code file in accordance with one embodiment of the present invention.

As previously mentioned, each programming language in software project 110 specifies the types of components that code can use, and how to instantiate each component. FIG. 2 illustrates exemplary methods for recognizing the various components. Turning to FIG. 2, component recognizer 220 recognizes components from a selected source code file 111 can provide useful information to an end user and/or a machine.

In one method, a method for identifying components in a software project via component recognizer 220 is as follows:

1. Set the current scope to the top-level component of a software project.
2. For each component in the current scope:
   a. If the component is an alias of some other component, then do nothing. A component is an alias of some other component if its definition consists solely of a reference to the other component.
   b. Otherwise, emit the component.
3. For each child scope of the current scope:
   a. Set the current scope to the child scope.
   b. Go to step 2.

In another embodiment, the component recognizer 220 additionally analyzes global information regarding recognized components. Advantageously, global information supplements the recognized components and resolves a number of ambiguities. For example, in a particular software project 110, the component recognizer 220 identifies a function "foo( )" in a selected source code file 111. The component recognizer 220 identified function "foo( )" using local information (e.g., data available on a local machine that is hosting the software project 110, data available within the software project 110, data available to the specific modules of the selected source code file 111, and so on). Using global information (e.g., a distinct module B that does not exist in the software project 110), additional information can be learned regarding the use of the function "foo( )" In the distinct module B, the function "foo( )" returns a value of type string. Therefore, the component recognizer 220 can supplement the recognized function "foo( )" to become "foo( ) string."

Even further, global information also can be used via component recognizer 220 to recognize additional components. When the source code files 111 of a software package does not define the components explicitly (or in a way that language analyzers 120 can understand), global information can be used to determine the components in the source code files 111. For example, functions can be defined explicitly (e.g., using "def FUNCTION_NAME") and implicitly (e.g., using Ruby's "method_missing" to dynamically create methods). When functions are defined implicitly, global information can be used to determine which implicitly defined functions are used in a local software project 110. Stated in another way, component recognizers 220 can benefit from global use of an implicitly defined function (many global calls to an implicitly defined function "buzz( )" can be used to infer that an implicitly defined function "buzz( )" does exist) to identify local uses of the function within the software project 110.

With reference again to FIG. 2, as illustrated, compilers/interpreters using these methods can use the identified components via component recognizer 220 to generate machine code 230. The most common reason for wanting to transform the source code and identify components is to create an executable program 240. In some cases, the machine-code is immediately executed using an ephemeral, intermediate machine-code representation 260. Unfortunately, to create a representation of a code structure 250, conventional compilers/interpreters often omit and alter information in the source code during the transformation from source code 111 to machine-code 230. Accordingly, system 100 advantageously produces a representation of the code structure 250, while preserving more information about the structure of the code.

In one embodiment, after collecting the set of emitted components, system 100 builds a representation of code structure 250 via a hierarchical scope path 3000 (FIG. 3) and definition location (FIG. 4) via component recognizer 220.

Figure 3:
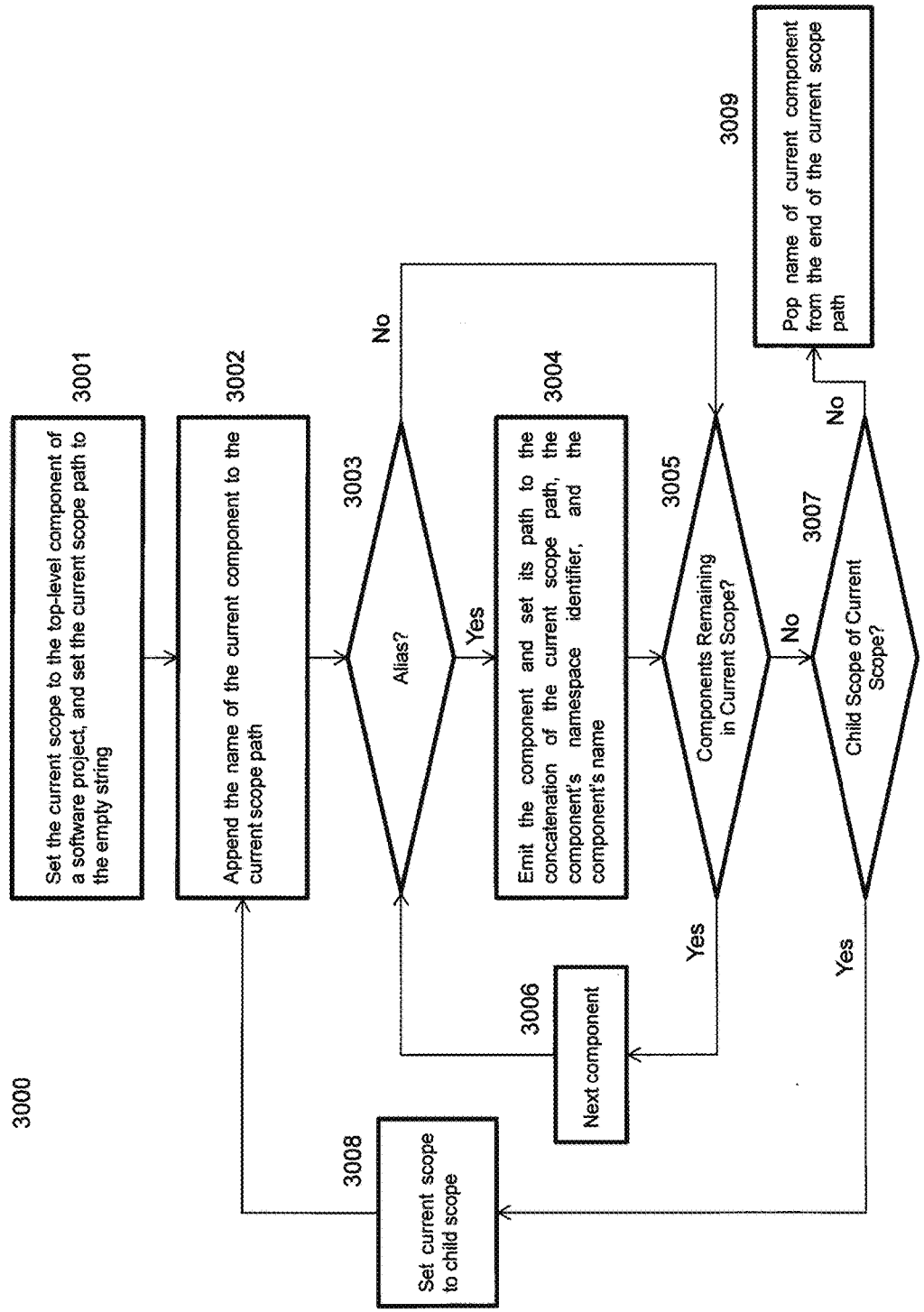
FIG. 3 illustrates a flowchart for determining the hierarchical path for all components in a software project in accordance with one embodiment of the present invention.

With reference to FIG. 3, each component of a software project can be thought of as existing somewhere in a hierarchy. For example, a package P may contain a module M, which contains 3 functions (F1, F2, F3), each of which contain variables named V. The hierarchical path to the first variable is P/M/F1/V, with slashes denoting successive levels in the hierarchy.

Representing the location of components in this way has several benefits over the traditional representation of character ranges in a file:

First, the hierarchical path is semantically meaningful. It encodes the location of the component in the code's structure, not just its line and column number in a file.

Second, the hierarchical path is invariant to changes in unrelated code. For example, the component at P/M/F1/V will exist at that path even if other code in the same file is changed, whereas the component's character range would change. This is analogous to referencing sections in a document instead of page numbers.

Additionally, the hierarchical path makes it easy, from an algorithmic performance perspective, to determine a component's ancestors or locate its descendants, by performing simple string manipulations on the path.

In FIG. 3, the method 3000 for determining the hierarchical path for all components in a software project is shown. Given a source code file 111, language analyzers 120 of system 100 sets the current scope to the top-level component of a software project, and sets the current scope path to the empty string (action block 3001). Subsequently, the name of the current component is appended to the current scope path (action block 3002). For each component in the current scope (decision block 3005 and action block 3006), if the component is an alias of some other component, then the component is ignored (decision block 3003). Otherwise, language analyzers 120 of system 100 emits the component and set its path to the concatenation of the current scope path, the component's namespace identifier, and the component's name (action block 3004).

Similarly, for each child scope of the current scope (decision block 3007), the current scope is set to the child scope (action block 3008) and method 3000 returns to action block 3002. Once all children scopes have been exhausted, system 100 pops the name of the current component from the end of the current scope path (action block 3009).

The namespace specifier in action block 3004 is intended to resolve ambiguity between components with the same name in the same scope. It is computed as follows:

1. If the current scope cannot contain multiple components with the same name, return the empty string.
2. If the current scope can contain multiple components with the same name, perform one of the following operations:

a. If components with the same name can exist if and only if they are of different kinds, return the component's kind as the namespace specifier.

b. Otherwise, return a string based on the component's character position as the namespace specifier.

In addition to determining the hierarchical path for all components in the software project to build a representation of code structure 250, system 100 further determines the definition location of the components.

Figure 4:
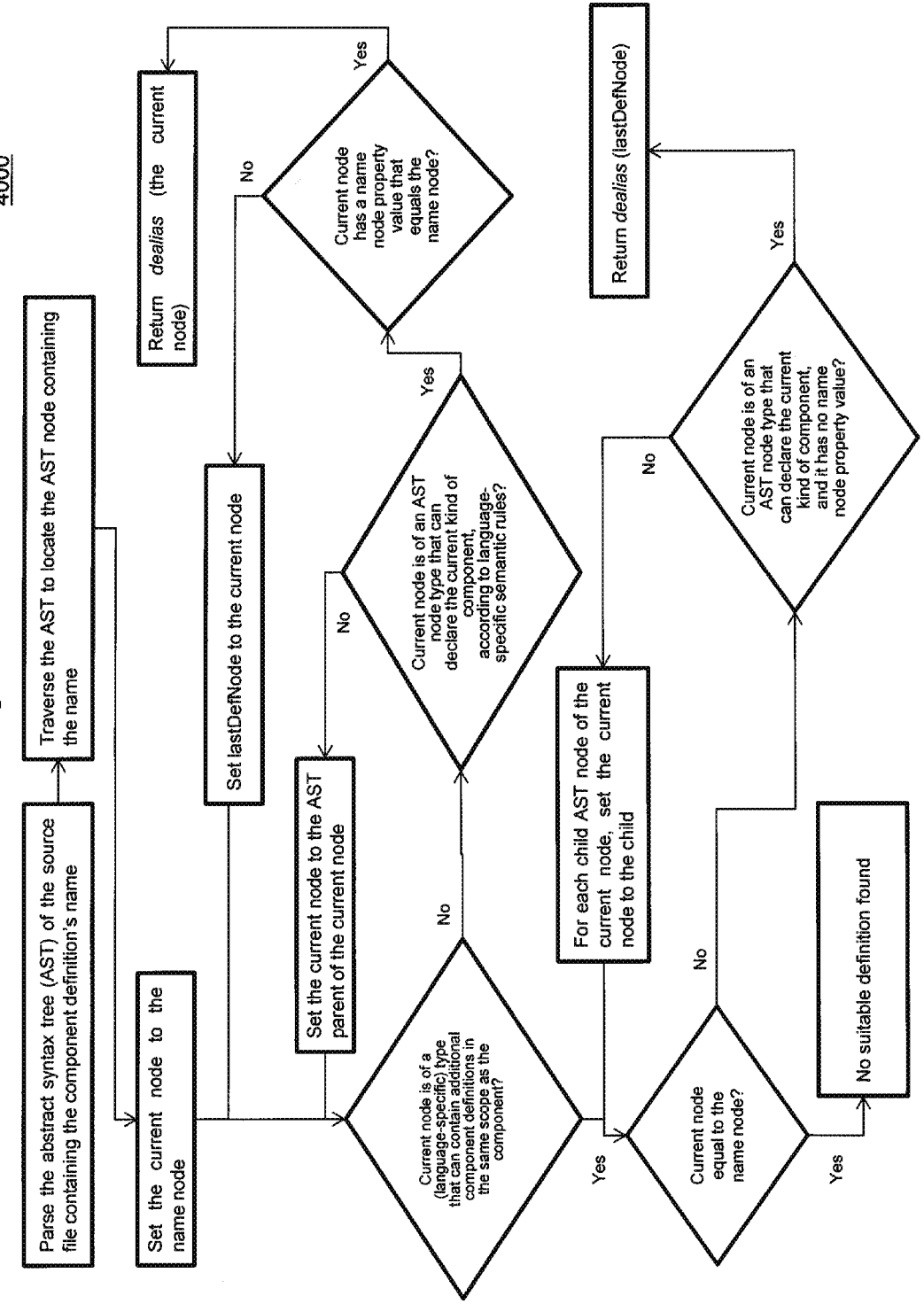
FIG. 4 illustrates a flowchart for determining the definition location from the name position of a component in accordance with one embodiment of the present invention.

The definition location of a component consists of the character ranges of the source code 110 in which the component is defined. Existing tools generally only specify the character position of the name in the component's definition, not the full range of the definition. Turning to FIG. 4, a method 4000 for determining the definition location from the name position is as follows.

1. Using language-specific techniques, parse the abstract syntax tree (AST) of the source file containing the component definition's name. Programming languages typically have built-in, or otherwise commonly available modules for parsing the language's AST, for example, Python's AST package, Go's "Go/AST" package, and Java's "JavacTask.parse." Accordingly, using an AST module for a selected language, for example, language analyzers 120 parse the AST of the source file containing the component definition's name.

2. Traverse the AST to locate the AST node containing the name.

3. Set the current node to the name node.

4. Until the current node is of a (language-specific type) that can contain additional component definitions in the same scope as the component:

a. If the current node is of an AST node type that can declare the current kind of component, according to language-specific semantic rules:

i. If the current node has a name node property value that equals the name node, return dealias(the current node).

ii. Otherwise, set lastDefNode to the current node and continue.

b. Set the current node to the AST parent of the current node.

5. Until the current node is equal to the name node:

a. If the current node is of an AST node type that can declare the current kind of component, and it has no name node property value, return dealias(lastDefNode).

b. For each child AST node of the current node, set the current node to the child and go to step 5.

6. If execution reaches this step, no suitable definition was found.

In one embodiment, the function dealias is defined as follows:

1. If the node resolves to a component that is an alias, then return dealias (target), where target is the component that the alias refers to.

2. Otherwise, return the node.

Returning to FIG. 1, the generated language-specific representation of the respective code structure of source code files 111 can be augmented with additional inferred information about its components. As previously discussed, computer languages vary in how explicit they require source code to be in describing a program's structure.

Even if the source code does not fully specify a component, external code that references the component, and programmers writing such code, typically needs to know the specification in order to avoid errors or unexpected behavior. The following Table 1 demonstrates four example methods by which the structure can be determined from code having varying degrees of specificity. Note that in #2-4, additional information was drawn from outside of the source code to construct a fully specified definition of the function component. As discussed above, global information can also be used to construct a fully specified definition of the function component.

TABLE 1

Example methods by which the structure can be determined from code having varying degrees of specificity

| Example | Code | Structure | How structure was determined |
|---|---|---|---|
| 1 | function (a integer) { return a } | function with parameter "a" of type integer | By recognizing explicit definition |
| 2 | /* @param a integer */ function(a) { return a } | function with parameter "a" of type integer | By recognizing annotation in comment preceding function |
| 3 | function(a) { return a*2 } | function with parameter "a" of numeric type | Type inference using rules (anything multiplied by a number is a number itself) |
| 4 | function F(a) { return a } F(3) | function with parameter "a" of numeric type | Type inference using constraints (because F(a) is instantiated with a = 3, a is a number |

Some languages require a full specification of components to compile the code into machine code; some languages only use the full specification for optimization during runtime; and some languages do not determine or utilize the full specification at all. To generate a full representation of the structure of a software project requires determining as full of a specification of all components as is possible.

Improved Constraint-Based Type Inference Using Global Probabilistic Models

Constraint-based type inference relies on seeing how components are used in order to infer properties about them. In one embodiment, determining the result of applying various type inference constraints include union, max, or heuristic-based algorithms.

In an alternative embodiment, language analyzers 120 of system 100 combine code structuring and indexing capabilities (described above) to find additional instances of functions, variables, etc., being used in source code files 111. From this larger dataset, system 100 builds a global probabilistic model based on existing type inference techniques applied locally at all usage sites of a component.

The probabilistic model for a component is built as follows:

1. Potential usage locations of the component, in the same software project and in others that language analyzers 120 of system 100 indexes, are identified.

The identification is performed by applying the full set of techniques described in this document, except for the use of the probabilistic model, to each project as a first pass. Because the goal of this step is to be able to determine where the component is used, not the details of its specification, those steps are sufficient.

To determine the usage locations of a component, we look for incoming cross-references to that component (described in the Cross-referencing and global code resolution section of this document).

2. The list of potential usage locations is grouped according to a scheme that tries to associate usages together that refer to the same version and variant of the component. The grouping is performed using explicit version specifications where present, and then by module (so that two usages in the same module of an external software project are grouped together). The goal is to cluster together usages that refer to the same component with the same specification.

For example, suppose a component has two versions, 1.0 and 2.0, each differing in the type of parameter accepted. It is possible for code to use both versions, however the same module is highly unlikely to simultaneously use both versions (and if it does, it is highly likely to explicitly specify the two versions).

3. The groups of potential usage locations are merged, in a further attempt to cluster together usages that refer to the same component. Groups that have explicit version specifications are merged first. Next, other groups of usages (without explicit version specifications) that contain no conflicts in the way they use the component are merged. The specific definition of a conflict is specific to the language and is based on information obtained by running existing type inference algorithms locally.

In one example, a usage group consisting of F(3) and another group consisting of F(6), for the same F, contain no conflicts because they both instantiate F with a parameter of the same (numeric) type. A group consisting of F(3) and another group consisting of F("hello") would present a conflict, because one instantiation has a numeric parameter and the other has a string parameter.

4. The largest group, as determined, for example, by the comprehensiveness of its usages and the popularity of the code it comprises, is taken to be the primary source for type inference.

Returning again to FIG. 1, while each programming language has different kinds, names, and configurations of components, there are many commonalities. By abstracting away the differences among programming languages, tools to aid programmers can deal with the abstraction layer and have wider applicability. The alternative is to build separate tools, or parts of tools, for each programming language, which requires additional effort. In one example, illustrated in Table 2, functions from different languages can be mapped to the same language-independent representation (also shown in FIG. 5).

TABLE 2

| Language | Function definition source code | Representation |
| --- | --- | --- |
| Python | def F(a): return a*2 | path = F<br>kind = function<br>name = F<br>params = F/a type integer<br>returns = type integer |
| Go | func F(a int) int { return a*2 } | same as above |
| JavaScript | function F(a) { return a*2 } | same as above |

Figure 5:
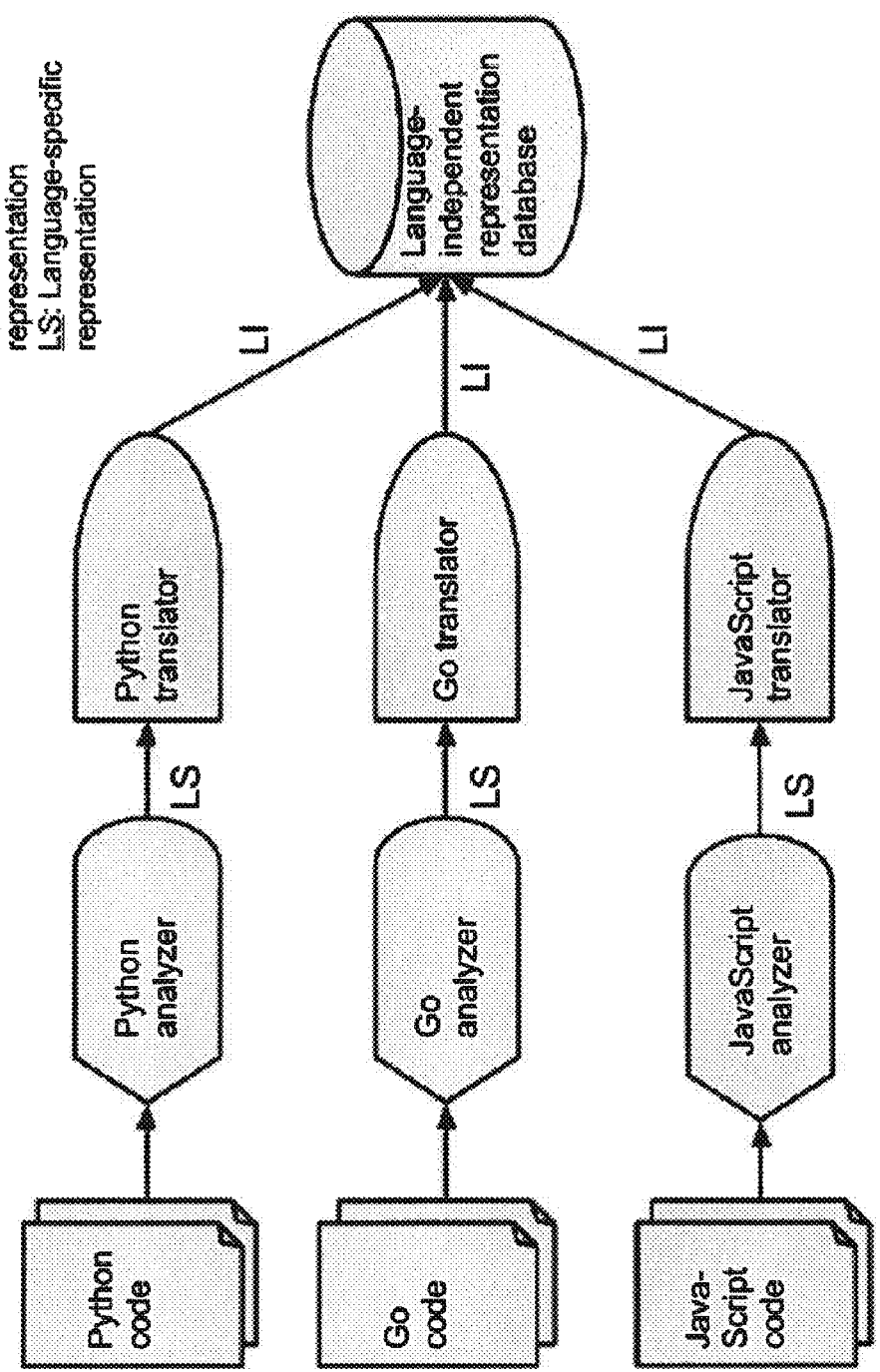
FIG. 5 illustrates a system for mapping language-specific representations to language-independent representations of code structure in accordance with one embodiment of the present invention.
Figure 6:
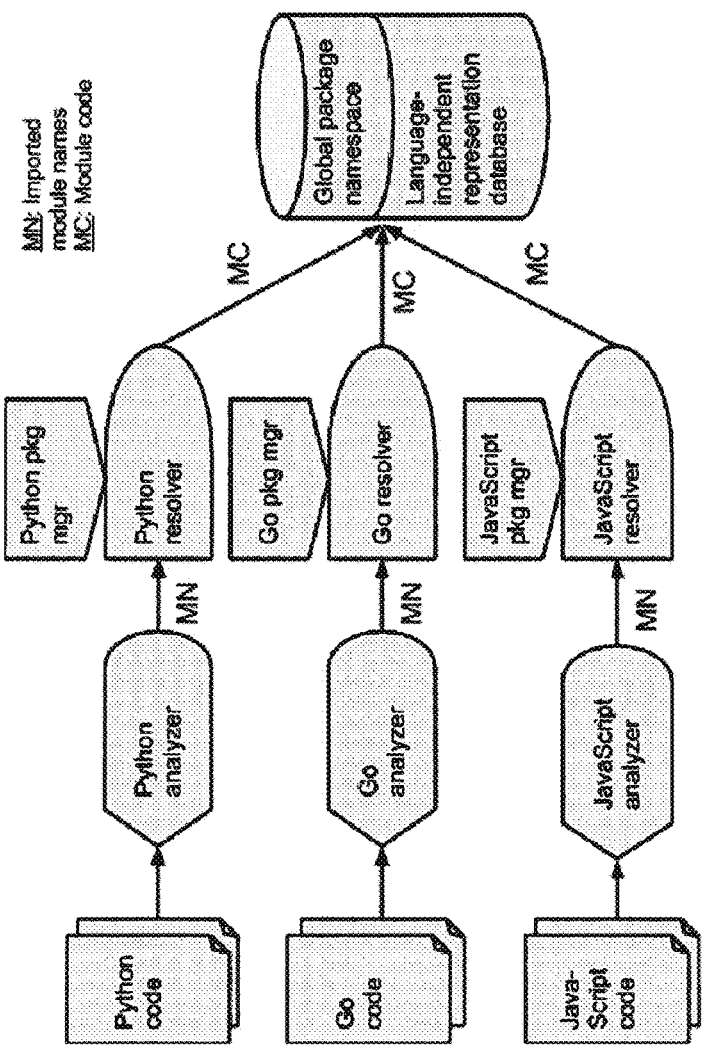
FIG. 6 illustrates a functional diagram for globally resolving packages for multiple languages in accordance with one embodiment of the present invention.

With reference to FIG. 5, exemplary architecture for mapping language-specific representations to language-independent representations of code structure is shown.

In addition to mapping language-specific representations to language-independent representations of code structure, system 100 is further configured to generate a unique language-independent format for representing code structure. As an advantage, the format enables programming tools to extract information from and apply techniques to code in software projects without requiring extensive language-specific customization, as is currently required for such tools.

In a preferred embodiment, the format is defined as follows:

```
type SymbolKey struct {
    // Repo is the VCS repository that defines this symbol
    Repo repos.Id
    // Path is the path to this symbol, relative to the repo.
    Path SymbolPath
    // Lang is the programming language that this symbol is defined in.
    Lang Lang
}
type Symbol struct {
    Key SymbolKey
    Kind SymbolKind
    Name string
    // File is the file that defines this symbol.
    File        string
    IdentStart  int
    IdentEnd    int
    DefStart    int
    DefEnd      int
    Exported    bool
    Data SymbolData
    // Contains data specific to this type of symbol.
    ConstData    *ConstData
    FuncData     *FuncData
    ModuleData   *ModuleData
    PackageData  *PackageData
    TypeData     *TypeData
    VarData      *VarData
    // Pkg is the package containing this symbol.
    Pkg SymbolPath
}
const (
    Const   SymbolKind  = "const"
    Func                = "func"
    Module              = "module"
    Package             = "package"
    Type                = "type"
    Var                 = "var"
)
type ConstData struct {
    ConstValue string
    // The source code representation of the type of this const.
    TypeExpr string
}
type FuncData struct {
    // RecvType is the type of the method receiver of this symbol
    if this symbol is a method;
    // otherwise Recv is nil.
    RecvType SymbolPath
    Params [ ]SymbolPath
    Signature string
}
type ModuleData struct {
    // Main is true if this module is the node.js package.json main module
    Main bool
}
type PackageData struct {
    Path string
}
type TypeData struct {
    // Consts is a list of constants of (mostly) this type.
    Consts [ ]SymbolPath
    // Fields is a list of fields of this type.
    Fields [ ]SymbolPath
    // Methods is a list of methods of this type.
    Methods [ ]SymbolPath
    // Vars is a list of variables of (mostly) this type.
    Vars [ ]SymbolPath
    Definition string
}
type VarData struct {
    // The source code representation of the type of this var.
    TypeExpr string
}
```

As briefly introduced above, in a further embodiment, system 100 is configured to resolve referencing. Information about cross-references is useful to the programmer in multiple ways. First, the programmer can easily look up usage examples of a particular component from multiple sources. This is often the fastest and most error-free way of learning how to make use of an unfamiliar component. Second, the number of cross-references to a particular component tells the programmer how much that component is used in other packages and products, yielding a strong signal of the quality and usefulness of the component. This information can be taken into account when comparing components that serve the same or similar purposes or deciding whether to use an existing component altogether versus writing one from scratch.

A package's location may either be local or remote. If local, then the package contents are simply fetched from the user's local machine or a machine on the local network. If remote, the contents are retrieved from a package index or repository accessible via the Internet. In both cases, the package manager often must be manually configured or enhanced to resolve the name into the correct location.

Capabilities

1) Globally Resolve Packages for Multiple Languages

System 100 analyzes the code of a given package and detects the names of the other packages that the current package imports. It then resolves these names into a globally unique identifier for each package and fetches the contents of each package into a unified database.

The first step in the package resolution process is the extraction of package names from source code. System 100 uses two methods to do this.

Method 1 makes use of configuration data included in the source code repository to configure a language-specific package manager. (Almost every programming language has a package manager that is used by programmers to manage inter-package dependencies. Many, but not all, software projects make use of package managers.) Sometimes, this data includes a list of the names of all packages on which the given project depends. In this case, system 100 parses the list from the configuration file(s). The parsing of the configuration data varies in complexity from language to language. In some cases, system 100 uses the language-specific package manager directly to parse the configuration data. In other cases, the package manager may not be used to emit this data, but the configuration data is stored as plain text, JSON, XML, or another format easily parsed by off-the-shelf software. In yet other instances, the configuration data is embedded in a code file written in a programming language. In this last case, system 100 uses the language structure analysis technology described earlier to analyze the source code file that contains the configuration data to extract all semantic components from the code in that file. It then looks up the component that contains the package names and records these.

Method 2 is used when there is no such configuration data available in the given codebase. Method 2 uses the language structure analysis technology to extract the key components from the source code. It analyzes all of the source code files in the repository to extract all the components in the repository. For each component, it checks if it is an imported package name, and if so, records that name, thereby generating a list of all imported package names in the project.

After recording the names of all imported packages, system 100 resolves and fetches these names into actual packages.

To resolve and fetch the imported packages, system 100 makes use of existing language-specific package managers. System 100 automatically configures and combines the output of these separate, language-specific package managers into a single system that resolves packages into a unified, language-independent package database and namespace.

The package database is a database that stores the source code and structured components of all packages indexed by system 100. The namespace is the collection of names, each of which uniquely identifies a package in the system. The names in the database are distinct from the package names as they appear originally in source code. The names used in system 100 follow the SymbolKey format defined above and are guaranteed to universally uniquely identify packages, whereas the raw package names are only unique within a specific language and code project.

The SymbolKey embeds the following information: language, repository URL, and path within the repository to the package declaration.

System 100 translates raw package names into SymbolKeys using one of the following methods: 1) direct translation, 2) package index lookup.

In variant 1, the raw name encodes all the information needed to construct the SymbolKey. In this case, system 100 uses regular expressions to parse and transform the raw name into a SymbolKey. For instance, in Go code, the package name "github.com/gorilla/mux" would resolve into SymbolKey{Repo: "github.com/gorilla/mux", Path: "github.com/gorilla/mux", Lang: "Go"}.

In variant 2, system 100 consults a package index, typically a third-party service accessible via the Internet, that can map a raw package name into a URL from which the package can be fetched. In some cases, the URL is the output of a command provided by the package index. In other cases, system 100 must parse the metadata returned by the package index to extract the URL. This URL typically encodes both the repository URL and path to the package within the repository.

In addition to converting the raw package name into a global unique identifier (i.e., the SymbolKey), system 100 also finds the location of a package and fetches its source code and contents if it does not already exist in the database. It does so by configuring and using a package manager or by fetching the contents directly using the repository URL.

When using a package manager to fetch package contents, system 100 configures the package manager to output the fetched contents into the directory that stores package source code.

The package manager may be further configured to consult different or non-standard package indexes, for instance, private package indexes that refer to code hosted on an internal network.

System 100 may also directly fetch the package contents by using the repository URL, using a version control system to fetch the contents at a given URL (e.g., "git clone https://github.com/gorilla/mux").

Internally, system 100 uses both a relational database and filesystem to store the package database. It stores the raw package contents (source code and other resources) in the filesystem. It stores the package SymbolKeys (and SymbolKeys of all the sub-components of the package) and semantic information as rows in the symbol table of the language-independent structured representation database previously described. The directory structure of the filesystem is organized in such a way that SymbolKeys can be easily mapped to the path to package contents. For example, SymbolKey{"github.com/django/django", "django", "python"}, which identifies the django package, would map to the directory path "<database-root>/github.com/django/django/django".

2) Identify and Locate Cross-References and Link them to Cross-Referenced Entities References (e.g., type references, function calls, external package names) to code components are identified and extracted by system 100's language analysis technology.

Local references are references to components defined within the same package or project. For instance, if a package defines a helper function and then later calls that helper function from another function, the latter function contains a local reference to the helper. Existing tools can identify local references using techniques used in off-the-shelf compilers and static analyzers.

Cross-references are references that refer to a component defined in another package or project.

To compute cross-references, system 100 combines its global package resolution system with its system for generating a language-independent representation and also with existing tools for computing local references. It uses the following algorithm to do so:

1. Given a package or code repository, it identifies and fetches the imported packages using the technique described above.

2. It then extracts the language-independent structured representation of the current project, also including the imported packages as input. This process makes use of existing tools to extract local references in addition to the key symbols and component definitions. Because the external packages have been fetched and included, references to their components can be detected by local reference detectors.

3. The references are subsequently recorded in a language-independent fashion. Each reference identifies 1) the location in source code (filename, character offset, and length) of the reference (e.g., function call, package import, or type reference) and the identifier for the component being referenced (e.g., the function, package, or type name).

4. The identifier name outputted by local reference detectors is then converted into globally unique SymbolKeys consistent with the entire database of cross-references.

Figure 7:
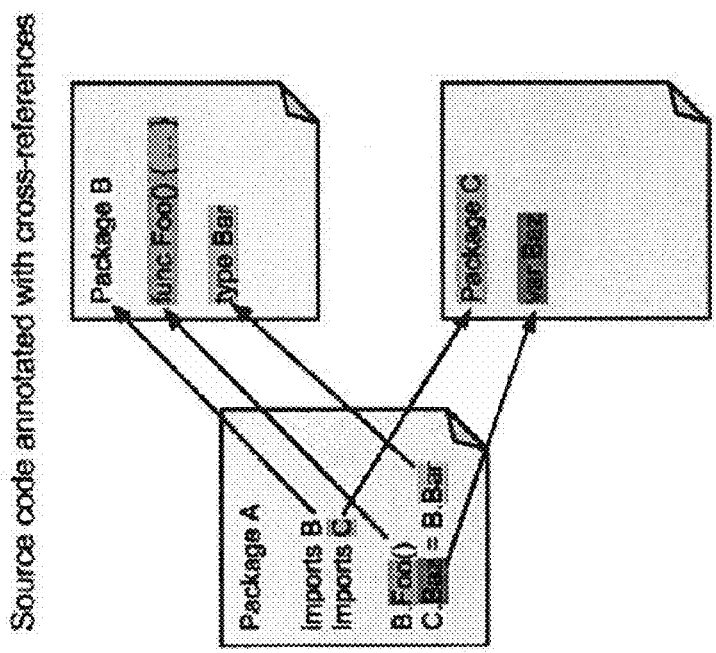
FIG. 7 illustrates a graphical representation of source code files annotated with cross-references in accordance with one embodiment of the present invention.

System 100 runs this process for many different packages across different repositories both publicly available on the Internet and privately accessible inside corporations. Viewing each cross-reference as an edge and each component as a node, System 100 thereby constructs a semantic graph database of the global network of code (see FIG. 7). As mentioned earlier, it uses the filesystem and relational databases to store the raw data as well as the extracted components.

Using this data, it can answer graph queries such as "enumerate all references to a specific code component" or "list how many cross-references this component has."

System 100 makes this information accessible to users via both a HTTP API and a GUI interface.

The HTTP API provides a language-independent interface over which external code can request, search, and modify the information stored in the database over HTTP. The information requested is returned in an easily parsed and machine-consumable format.

The GUI is web-based, but could also be implemented on desktop and mobile platforms. All of these would query the programmatic interface to access the data.

For each symbol, there is a page (see screenshot) that displays cross-reference examples of how other packages use the symbol, discussion and comments about the symbol, the definition of the symbol in code, and various statistics generated from system 100's package database, such as a list of other projects that use the symbol, a list of library authors that use the symbol, and the total number of internal and cross-reference usage examples. In usage examples, it highlights cross-references in a graphical manner by annotating the raw source code. The annotation process highlights the text that contains references and hyperlinks these to a page corresponding to the referenced symbol. This is roughly analogous to the way web pages on the Internet reference each other via hyperlinks. All cross-references are highlighted, not just references to the page's symbol, allowing the user to explore links within the code freely and easily.

A package is a type of symbol that can include other symbols. For a given package, in addition to the above information, the page (see screenshot) also displays a list of the most commonly used symbols within that package and additional data associated with each symbol, such as the function signature if the symbol refers to a function and the number of cross-references to the symbol in system 100's database.

The GUI also provides a search engine (see screenshot) that accepts a user query to search for code components by text, language, semantic type, and other semantic information.

The system 100 API can also be integrated with existing development tools to enhance the user experience with useful and meaningful semantic information. For instance, a plugin for a code text editor or IDE could be implemented to use the type and symbol information from system 100 to provide highly accurate auto-complete across multiple languages.

Unlike existing tools that have constructed a graph of code components linked by references, system 100 uses information acquired via the in-depth semantic analysis described above, rather than text-based techniques such as regular expressions. It is thereby able to link and annotate with much greater accuracy and robustness.

Computer System Architecture Overview

Figure 8:
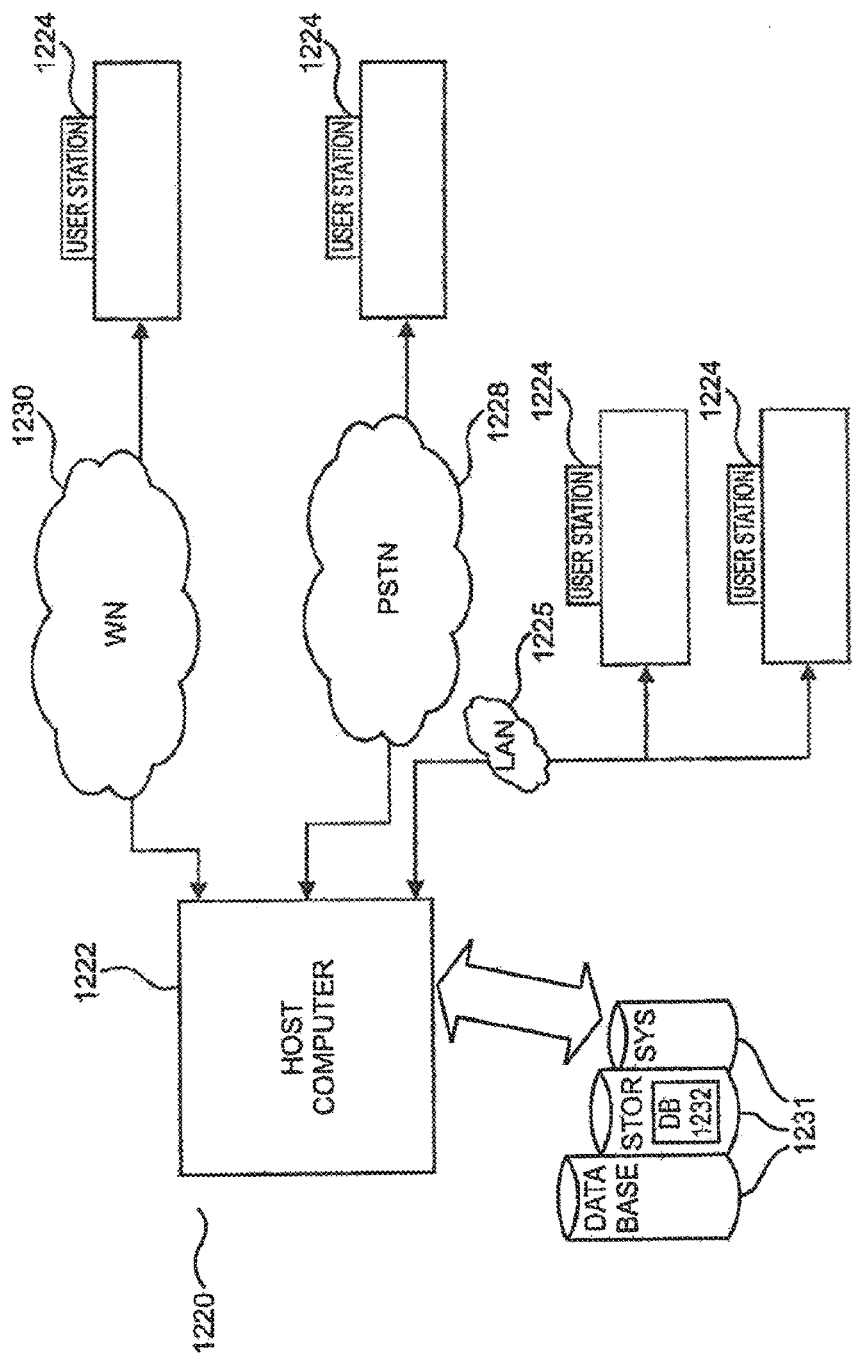
FIG. 8 illustrates a computer system on which language-independent representations of software are generated and stored in accordance with one embodiment of the present invention.

In an embodiment, the components of the apparatus discussed in the embodiments above reside in a computer system, which has been configured using the above-described components to create a special-purpose apparatus for generating a language-independent representation of a software project's structure from its code as discussed above. Referring to FIG. 8, in an embodiment, a computer system 1220 includes a host computer 1222 connected to a plurality of individual user stations 1224. In an embodiment, the user stations 1224 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1224 are connected to the host computer 1222 via a local area network ("LAN") 1225. Other user stations 1224 are remotely connected to the host computer 1222 via a public telephone switched network ("PSTN") 1228 and/or a wireless network 1230.

In an embodiment, the host computer 1222 operates in conjunction with a data storage system 1231, wherein the data storage system 1231 contains a database 1232 that is readily accessible by the host computer 1222. The database 1232 in an embodiment contains the language-independent representations, as discussed above, and permits access to them. In an alternative embodiment, the language-independent representations are stored in a computer memory while in operation, and is then persisted to the database 1232.

In alternative embodiments, the data storage system 1231 and/or database 1232 may be resident on the host computer, stored, e.g., in the host computer's ROM, PROM, EPROM, or any other memory chip, and/or its hard disk, in yet alternative embodiments, the database 1232 may be read by the host computer 1222 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 1222 can access two or more databases 1232, stored in a variety of mediums, as previously discussed.

Figure 9:
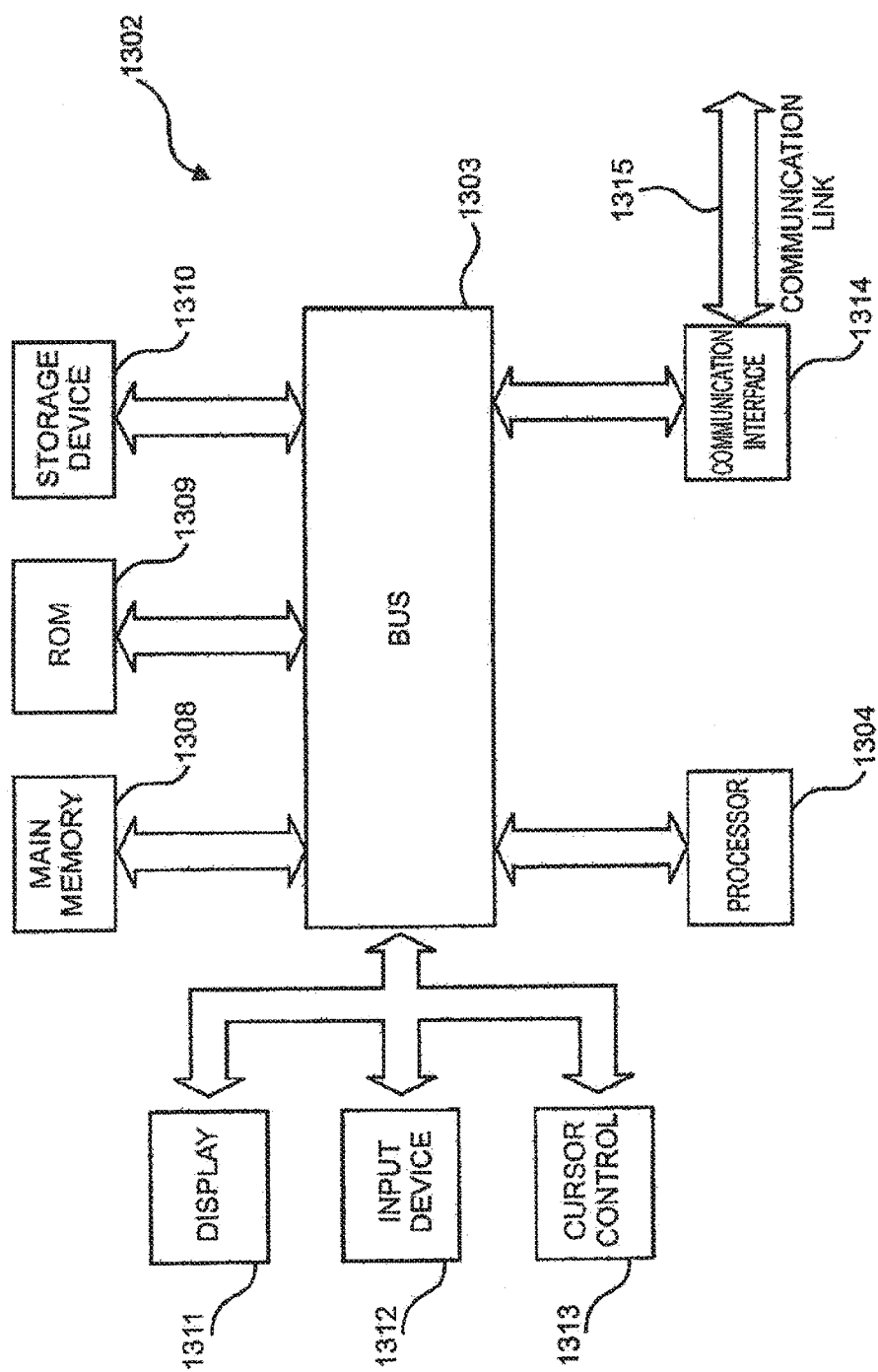
FIG. 9 illustrates a processing unit belonging to the computer system of FIG. 8 in accordance with one embodiment of the present invention.

Referring to FIG. 9, in an embodiment, each user station 1224 and the host computer 1222, each referred to generally as a processing unit, embodies a general architecture 1302. A processing unit includes a bus 1303 or other communication mechanism for communicating instructions, messages and data, collectively, information, and one or more processors 1304 coupled with the bus 1303 for processing information. A processing unit also includes a main memory 1308, such as a random access memory (RAM) or other dynamic storage device, coupled to the bus 1303 for storing dynamic data and instructions to be executed by the processor(s) 1304. The main memory 1308 also may be used for storing temporary data, i.e., variables, or other intermediate information during execution of instructions by the processor(s) 1304. In an embodiment, the main memory 1308 contains the language-independent representations, and permits users to access these representations as discussed herein.

A processing unit may further include a read only memory (ROM) 1309 or other static storage device coupled to the bus 1303 for storing static data and instructions for the processor(s) 1304. A storage device 1310, such as a magnetic disk or optical disk, may also be provided and coupled to the bus 1303 for storing data and instructions for the processor(s) 1304.

A processing unit may be coupled via the bus 1303 to a display device 1311, such as, but not limited to, a cathode ray tube (CRT), for displaying information to a user. An input device 1312, including alphanumeric and other keys, is coupled to the bus 1303 for communicating information and command selections to the processor(s) 1304. Another type of user input device may include a cursor control 1313, such as, but not limited to, a mouse, a trackball, a fingerpad, or cursor direction keys, for communicating direction information and command selections to the processor(s) 1304 and for controlling cursor movement on the display 1311.

According to one embodiment of the invention, the individual processing units perform specific operations by their respective processor(s) 1304 executing one or more sequences of one or more instructions contained in the main memory 1308. Such instructions may be read into the main memory 1308 from another computer-usable medium, such as the ROM 1309 or the storage device 1310. Execution of the sequences of instructions contained in the main memory 1308 causes the processor(s) 1304 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1304. Such a medium may take many forms, including, but not limited to, non-volatile, volatile and transmission media. Non-volatile media, i.e., media that can retain information in the absence of power, includes the ROM 1309. Volatile media, i.e., media that cannot retain information in the absence of power, includes the main memory 1308. Transmission media includes coaxial cables, copper wire and fiber optics, including the wires that comprise the bus 1303.

Common forms of computer-usable media include, for example; a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, or any other physical medium from which a processor 1304 can retrieve information.

Various forms of computer-usable media may be involved in providing one or more sequences of one or more instructions to the processors) 1304 for execution. For example, the instructions may initially be provided on a magnetic disk of a remote computer (not shown). The remote computer may load the instructions info its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1303 may receive the infrared signals and place the instructions therein on the bus 1303. The bus 1303 may carry the instructions to the main memory 1308, from which the processors) 1304 thereafter retrieves and executes the instructions. The instructions received by the main memory 1308 may optionally be stored on the storage device 1310, either before or after their execution by the processor(s) 1304.

Each processing unit may also include a communication interface 1314 coupled to the bus 1303. The communication interface 1314 provides two-way communication between the respective user stations 1224 and the host computer 1222. The communication interface 1314 of a respective processing unit transmits and receives electrical, electromagnetic or optical signals that include data streams representing various types of information, including instructions, messages and data.

A communication link 1315 links a respective user station 1224 and a host computer 1222. The communication link 1315 may be a LAN 1225, in which case the communication interface 1314 may be a LAN card. Alternatively, the communication link 1315 may be a PSTN 1228, in which case the communication interface 1314 may be an Integrated services digital network (ISDM) card or a modem. Also, as a further alternative, the communication link 1315 may be a wireless network 1230.

A processing unit may transmit and receive messages, data, and instructions, including program, i.e., application, code, through its respective communication link 1315 and communication interface 1314. Received program code may foe executed by the respective processor(s) 1304 as it is received, and/or stored in the storage device 1310, or other associated non-volatile media, for later execution.

The language used above to disclose various embodiments describes, but should not limit, the scope of the claims. For example, in the foregoing description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood and apparent to one skilled in the art. Similarly, the reader is to understand that the specific ordering and combination of process actions described is merely illustrative, and the disclosure may be performed using different or additional process actions, or a different combination of process actions.

Each of the additional features and teachings disclosed herein can be utilized separately or in conjunction with other features and teachings to provide systems and methods for generating a language-independent representation of a software project's structure. Representative examples using many of these additional features and teachings, both separately and in combination, are described in further detail with reference to the attached drawings. This detailed description is merely intended for illustration purposes to teach a person of skill in the art further details for practicing preferred aspects of the present teachings and is not intended to limit the scope of the claims. Therefore, combinations of features disclosed in the detailed description may not be necessary to practice the teachings in the broadest sense, and are instead taught merely to describe particularly representative examples of the present disclosure. Additionally and obviously, features may be added or subtracted as desired without departing from the broader spirit and scope of the disclosure. Accordingly, the disclosure is not to be restricted except in light of the attached claims and their equivalents.

What is claimed is:

1. A system for generating a language-independent representation of a software project's structure from its source code comprises:
   one or more language analyzers, each comprising a language structurer system and a language inferencer system for a selected language,
   wherein said language structurer system generates a language-specific representation of code structure from the software project, and said language inferencer system augments the language-specific representation with additional, inferred information;
   one or more language translators in communication with said one or more language analyzers for mapping from language-specific components to language-independent components, wherein said language-independent components represent a source-to-source translation that maintains a semantic structure of the software project's source code such that each language-independent component corresponds to at least one of a function, a method, a package, a class, a type, a field, a variable declaration, a comment, an interface, a reference to the function, a reference to the method, a reference to the package, a reference to the class, a reference to the type, a reference to the field, and a reference to the variable declaration; and
   a database for storage of the language-independent components.

2. The system of claim 1, wherein said language analyzers globally resolve packages of the software project, identify and locate cross-references to the packages, and link the located cross-references to cross-referenced entities.

3. The system of claim 1, wherein said language structurer system comprises one or more component recognizers that identify the language-specific components of the software project to create the language-specific representation of code structure.

4. The system of claim 3, wherein said component recognizers create a hierarchical scope path of the identified components representing hierarchical levels of the code structure.

5. The system of claim 3, wherein said component recognizers create a definition location of the identified components representing character ranges of the code structure.

6. The system of claim 1, wherein said language inferencer system augments the language-specific representation with global information regarding the language-specific components of the software project.

7. The system of claim 1, wherein the additional, inferred information is obtained from at least one of constraint-based type inference and global probabilistic models.

8. A method for generating a language-independent representation of a software project's structure from its code comprises:
   generating a language-specific representation of code structure from the software project via one or more language structurer systems,
   augmenting the language-specific representation with additional, inferred information via one or more language inferencer systems;
   mapping from language-specific components to language-independent components via one or more language translators in communication with said one or more language analyzers, wherein said language-independent components represent a source-to-source translation that maintains a semantic structure of the software project's source code such that each language-independent component corresponds to at least one of a function, a method, a package, a class, a type, a field, a variable declaration, a comment, an interface, a reference to the function, a reference to the method, a reference to the package, a reference to the class, a reference to the type, a reference to the field, and a reference to the variable declaration; and
   storing the language-independent components in a database.

9. The method of claim 8, further comprising globally resolving packages of the software project; identifying and locating cross-references to the packages; and linking the located cross-references to cross-referenced entities.

10. The method of claim 8, further comprising identifying the language-specific components of the software project via component recognizers to create the language-specific representation of code structure.

11. The method of claim 10, further comprising creating a hierarchical scope path of the identified components representing hierarchical levels of the code structure.

12. The method of claim 10, further comprising creating a definition location of the identified components representing character ranges of the code structure.

13. The method of claim 8, wherein said augmenting the language- specific representation further comprises augmenting the language-specific representation with global information regarding the language-specific components of the software project.

14. The method of claim 8, wherein said augmenting the language- specific representation comprises at least one of constraint-based type inference and global probabilistic models.

15. A non-transitory computer-readable medium having stored thereon a plurality of instructions for generating a language-independent representation of a software project's structure from its code, the instructions, when executed by a processor, causing the processor to perform:
   generating a language-specific representation of code structure from the software project via one or more language structurer systems, augmenting the language-specific representation with additional, inferred information via one or more language inferencer systems;

mapping from language-specific components to language-independent components via one or more language translators in communication with said one or more language analyzers, wherein said language-independent components represent a source-to-source translation that maintains a semantic structure of the software project's source code such that each language-independent component corresponds to at least one of a function, a method, a package, a class, a type, a field, a variable declaration, a comment, an interface, a reference to the function, a reference to the method, a reference to the package, a reference to the class, a reference to the type, a reference to the field, and a reference to the variable declaration; and storing the language-independent components in a database.

16. The non-transitory computer-readable medium of claim 15, further comprising globally resolving packages of the software project; identifying and locating cross-references to the packages; and linking the located cross-references to cross-referenced entities.

17. The non-transitory computer-readable medium of claim 15, further comprising identifying the language-specific components of the software project via component recognizers to create the language-specific representation of code structure.

18. The non-transitory computer-readable medium of claim 17, further comprising creating a hierarchical scope path of the identified components representing hierarchical levels of the code structure.

19. The non-transitory computer-readable medium of claim 17, further comprising creating a definition location of the identified components representing character ranges of the code structure.

20. The non-transitory computer-readable medium of claim 15, wherein said augmenting the language-specific representation further comprises augmenting the language-specific representation with global information regarding the language-specific components of the software project.

* * * * *